(12) United States Patent
Shondel et al.

(10) Patent No.: US 11,465,266 B2
(45) Date of Patent: Oct. 11, 2022

(54) HOUSING FOR AN ELECTRIC MACHINE TOOL

(71) Applicant: C. & E. Fein GmbH, Schwaebisch Gmuend-Bargau (DE)

(72) Inventors: Aryon Shondel, Schwaebisch-Gmuend (DE); Achim Hess, Korb (DE); Ralf Gosnik, Eislingen (DE); Boris Richt, Hemmingen (DE); Sergej Denzel, Schwaebisch-Gmuend (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 396 days.

(21) Appl. No.: 16/720,880

(22) Filed: Dec. 19, 2019

(65) Prior Publication Data

US 2020/0198023 A1 Jun. 25, 2020

(30) Foreign Application Priority Data

Dec. 19, 2018 (DE) .................... 10 2018 132 874.5

(51) Int. Cl.
*B25F 5/00* (2006.01)
*B23B 45/00* (2006.01)
*B23B 51/06* (2006.01)

(52) U.S. Cl.
CPC ............ *B25F 5/008* (2013.01); *B23B 45/001* (2013.01); *B23B 51/06* (2013.01); *B23B 2200/162* (2013.01); *B23B 2205/12* (2013.01)

(58) Field of Classification Search
CPC ........ B25F 5/008; B23B 45/001; B23B 51/06
USPC .............................................. 173/217; 310/50
See application file for complete search history.

(56) References Cited

U.S. PATENT DOCUMENTS

| 2,155,082 A | 4/1939 | Decker | |
|---|---|---|---|
| 6,043,575 A * | 3/2000 | Ghode | .................... H02K 7/145 310/91 |
| 7,152,695 B2* | 12/2006 | Happ | ...................... B25F 5/006 173/217 |
| 2007/0221392 A1* | 9/2007 | Britz | ....................... B25F 5/008 173/213 |

FOREIGN PATENT DOCUMENTS

| CH | 345262 | 3/1960 |
| DE | 103 58 027 A1 | 7/2005 |
| DE | 10 2010 044 105 A1 | 5/2012 |
| EP | 0 794 038 A2 | 9/1997 |
| EP | 1 541 293 A1 | 6/2005 |
| EP | 3 479 967 A1 | 5/2019 |
| ER | 2 455 196 A2 | 5/2012 |
| JP | 2011-104671 A | 6/2011 |

* cited by examiner

*Primary Examiner* — Michelle Lopez
(74) *Attorney, Agent, or Firm* — Muncy, Geissler, Olds & Lowe, P.C.

(57) ABSTRACT

A housing for an electric machine tool, in particular for a core drill, said housing in which a motor is accommodated, which has a motor shaft for driving a tool mount and to which cooling air is supplied through at least one air guide duct, which is delimited at one end by at least one air inlet and at the other end by at least one air outlet. A guide structure, providing air guidance for the cooling air and associated with a motor mount, in which the motor is at least partially accommodated, is disposed in the air guide duct downstream from the at least one air inlet.

14 Claims, 5 Drawing Sheets

HOUSING FOR AN ELECTRIC MACHINE TOOL

This nonprovisional application claims priority under 35 U.S.C. § 119(a) to German Patent Application No. 10 2018 132 874.5, which was filed in Germany on Dec. 19, 2018, and which is herein incorporated by reference.

BACKGROUND OF THE INVENTION

Field of the Invention

The present invention relates to a housing for an electric machine tool, in particular for a core drill, said housing in which a motor is accommodated which has a motor shaft for driving a tool mount and to which cooling air is supplied through at least one air guide duct which is delimited at one end by at least one air inlet and at the other end by at least one air outlet.

Description of the Background Art

In electric machine tools and in particular in core drills, the problem often arises that with increasing power of the motors installed in electric machine tools, heat generation increases sharply, which then results in insufficient cooling power to effectively dissipate this heat generated during operation. To overcome this problem, it is therefore customary to increase the cooling capacity, for example, by installing improved fans or even additional fans. The term 'core drills' also covers in particular magnetic core drills which have a magnetic base with which the electric machine tools can be held on the workpiece to be machined by means of a magnetic force.

However, this involves the problem that the optimization of the fans has proven to be very complex and the use of additional fans is associated with increased costs and an increased space requirement, as a result of which in particular the costs increase and the respective electric tool machines can no longer be made compact.

SUMMARY OF THE INVENTION

It is therefore an object of the present invention to reduce the aforementioned disadvantages and provide a housing for an electric machine tool that enables a simplified heat dissipation.

The object is achieved according to an exemplary embodiment of the invention with a housing of the aforementioned type in that a guide structure, providing air guidance for the cooling air and associated with a motor mount in which the motor is at least partially accommodated, is disposed in the air guide duct downstream of the at least one air inlet.

The guide structure ultimately serves to selectively supply the cooling air, flowing through the air inlet, to the motor. In particular, the motor mount provides a guide through which the cooling air can flow and can be specifically fed to the motor parts particularly requiring cooling. These features can significantly reduce the temperature of the motor by up to 30 K, which improves the operational reliability of the machine and can significantly reduce failure rates. The use of the guide structure, which has a motor mount, can also achieve that motors of different sizes can be used in only one housing. At most, the guide structure has to be adapted to the motors used. Due to the universally usable housing achievable thereby, the costs in particular can be significantly reduced.

In this regard, it has also proven particularly useful if the motor mount is disposed in the area of the commutator of the motor, because a great deal of heat is generated in particular here, which then has to be dissipated again. It is ultimately achieved by the motor mount of the guide structures, said mount being disposed in the area of the commutator, that cooling-intensive areas can be selectively supplied with cooling air, it being possible to selectively dissipate locally arising heat.

It has also proven to be favorable if the guide structure comprises a plate-shaped base body and if the motor mount extends substantially perpendicular to the base body. In particular the airflow coming from the air inlet can be channeled particularly well through the base body and the motor mount disposed perpendicular thereto. In this case, it has proven particularly effective if the plate-shaped base body is axially spaced in the flow direction from the at least one air inlet. This ensures that the cooling air, which flows into the housing via the at least one air inlet, can be guided particularly easily from the plate-shaped base body to the motor. In the context of the invention, however, it is explicitly also provided that, in particular if a plurality of air inlets are present, a portion of the air inlets is arranged above the plate-shaped base body and a portion below the plate-shaped base body in each case with regard to the longitudinal axis of the motor shaft.

It has proven itself effective further, if the motor mount is disposed on the guide structure side facing away from the tool mount. As a result, the flow direction of the cooling air, which is fed via the at least one air inlet into the housing, is at least partially reversed, so that any particles contained in the incoming airflow are not included in the cooling airflow, which is supplied to the motor, but are filtered out of it, which can additionally improve the life of the motor.

It also proved to be favorable if a gap, which has a width which lies between 10% and 30% and particularly preferably between 15% and 20% of the motor shaft diameter, is formed between the motor mount and the part of the motor surrounded by the motor mount. As a result, the channeling of the cooling air is ultimately determined depending on the motor size and thus increases the flow velocity, which ultimately has a positive effect on the cooling capacity.

The gap can have an annular shape at least in sections. This allows the gap to be adapted to the outer shape of the motor.

At least one plug-in recess can be formed in the housing for detachably receiving the guide structure. If a motor with other dimensions is to be used, it is thereby possible to replace only the guide structure, without having to change the housing.

In order to facilitate assembly, it has also been shown to be advantageous if the housing is formed of multiple parts and comprises a first housing part and a second housing part, which are detachably connectable to one another by a plug connection. The assembly is also further simplified if the guide structure is formed of multiple parts. Thus, the guide structure can be particularly easily mounted in the housing.

Passages can be formed in the guide structure. This makes it possible to lead the connection cables from the motor out of the housing. In particular, in the case of core drills, it is usually the case that the control electronics of the motor are housed spatially separated from it in a separate electronics housing. In this case, the connection cables are then led out of the housing to the electronics housing and are contacted there with the electronics.

The passages can be covered at least partially by covers. The covers can be formed, for example, as cross-slit rubber membranes, which achieves that the connection cables can be led out and at the same time as much of the incoming air as possible is supplied to the motor as cooling air.

A guide insert can be provided whose longitudinal axis is oriented substantially parallel to the motor shaft of the motor. This guide insert, which is formed as a separate component, can be disposed in particular in the housing, if the motor has electronics, which are housed in the separate electronics housing and not just in the housing in which the motor is accommodated. In this regard, it has proven to be particularly advantageous if the guide insert is disposed immediately adjacent to the motor. The temperature of the motor can be further significantly reduced thereby by up to 10 K. For machines in which the electronics are disposed in the housing, then of course the guide insert can be dispensed with and the electronics used in its place.

The outer contour of the guide structure can be adapted to the inner contour of the housing. As a result, the guide structure can be effectively sealed from the housing and the flow of cooling air is ultimately forced to flow past between the motor mount and the motor, further improving the cooling performance.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
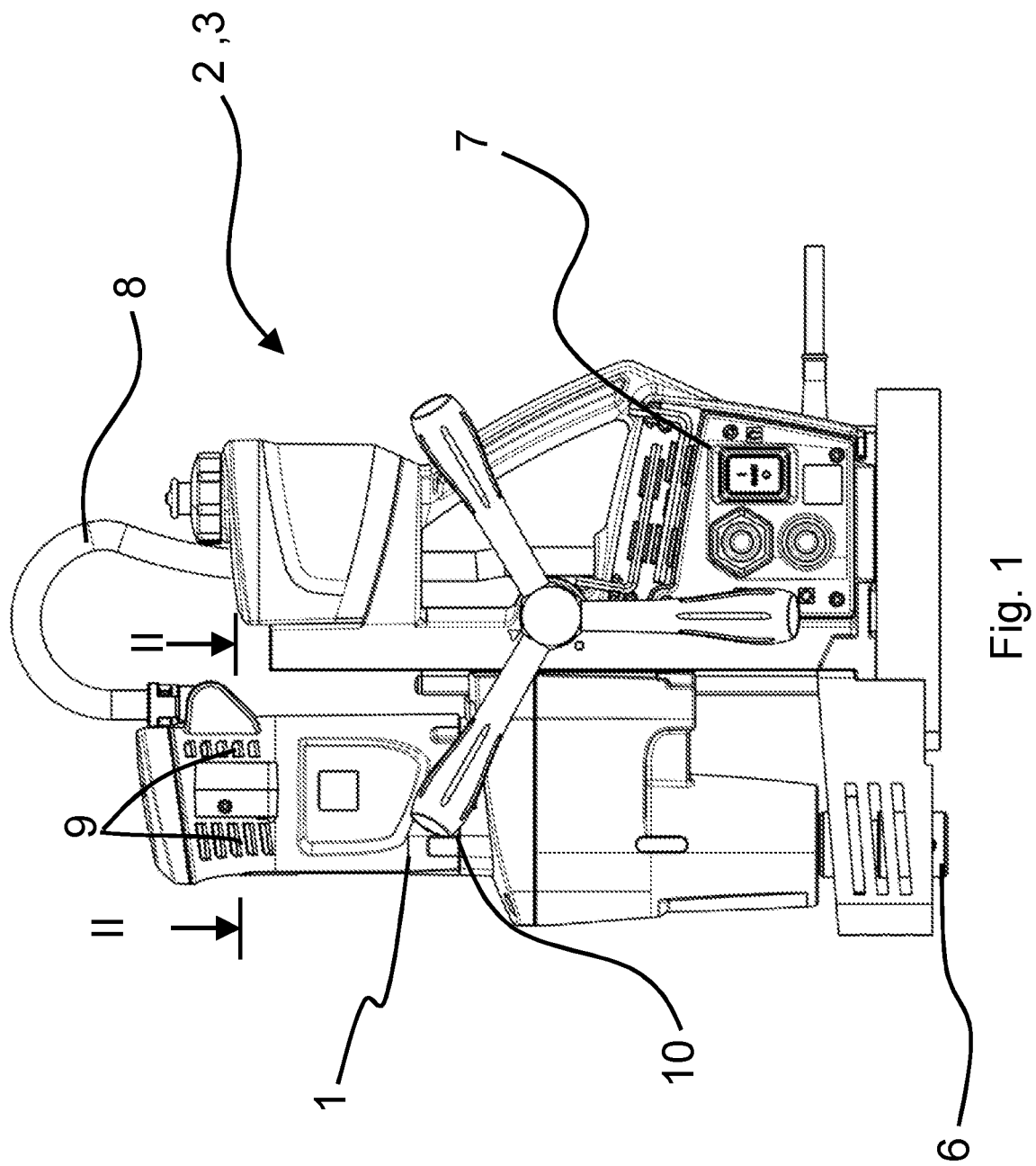
FIG. 1 shows a side view of an electric machine tool.

FIG. 1 shows a side view of an electric machine tool 2, which has a housing 1 and is formed in the exemplary embodiment shown as a core drill 3. In housing 1 of core drill 3, a motor 4 is accommodated, which drives a tool mount 6 with a drilling tool received therein via a motor shaft 5. Core drill 3, which is shown in FIG. 1, has, in addition to housing 1 in which motor 4 is accommodated, an electronics housing 7 in which the electronics with which motor 4 is controlled are accommodated. Motor 4 is connected to the electronics via a connecting cable 8 disposed between housing 1 and electronics housing 7. In housing 1, air inlets 9 and air outlets 10 are formed which delimit an air duct 11 through which cooling air is supplied to motor 4, as will become even clearer in particular from FIGS. 2 and 3 discussed below.

Figure 2:
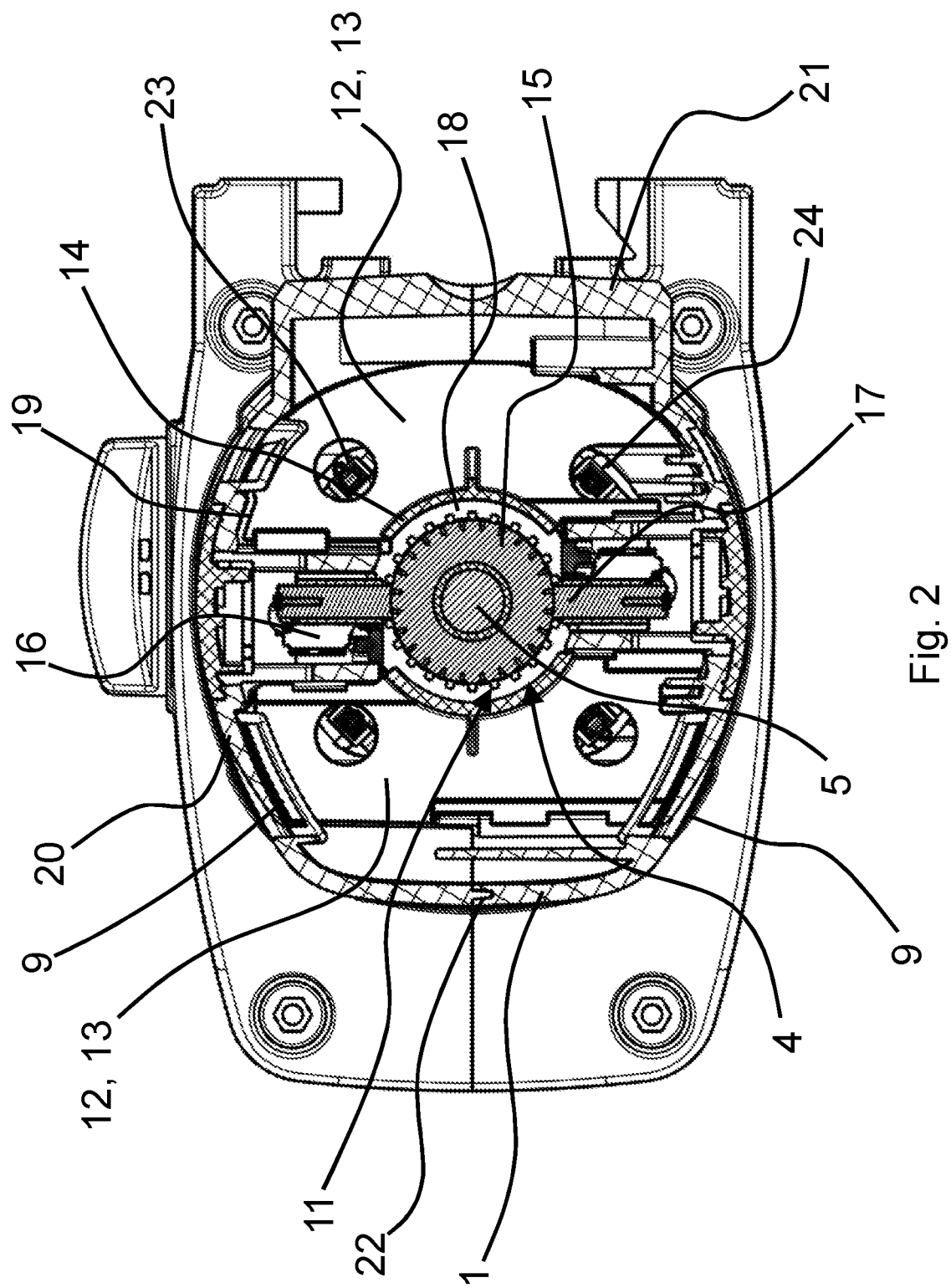
FIG. 2 shows a sectional view taken along section II-II of FIG. 1.

FIG. 2 shows the interior of housing 1 in a sectional view along the section II-II from FIG. 1. It can be seen from this in particular that a guide structure 12, which is formed of multiple parts in the exemplary embodiment shown and ultimately comprises two halves, is disposed in housing 1. In this case, the outer contour of guide structure 12 is adapted to the inner contour of housing 1 in order to achieve sealing against housing 1. The two parts of guide structure 12 each have a plate-shaped base body 13, which is axially spaced in the flow direction from the at least one air inlet 9. Furthermore, guide structure 12 comprises a motor mount 14, which extends substantially perpendicular to base body 13. The air flowing in through air inlets 9 is first deflected by motor mount 14, so that any impurities contained in the cooling air, such as chips or other impurities resulting from the machining of workpieces, are not introduced into air duct 11 and thus not fed into motor 4. The fact that the airflow is initially deflected therefore significantly reduces the risk of damage to motor 4. In the exemplary embodiment shown, motor mount 14 is disposed in the area of a commutator 15 of motor 4, which is disposed on the end of motor 4, said end facing away from tool mount 6. Due to the two-part nature of guide structure 12, there is also enough installation space in housing 1 to accommodate brush holders 16 with carbon brushes 17 therein. Motor mount 14 is disposed on the side, facing away from tool holder 6, of guide structure 12. A gap 18, which has a width which lies between 15% and 20% of the diameter of motor shaft 5 in the exemplary embodiment shown, is formed between motor mount 14 and the part of motor 4 surrounded by motor mount 14, Motor mount 14 has a ring-segment-like cross section, as can be gathered from FIG. 2. Because commutator 15 also has a substantially round cross section, gap 18 as well has a ring-segment-like shape at least in sections. At least one plug-in recess 19 is formed in housing 1 for detachably receiving guide structure 12. Thereby, guide structure 12 can be easily inserted into housing 1, as a result of which one is able to adapt guide structure 12 to the requirements and external dimensions of the motor 4 used.

Figure 3:
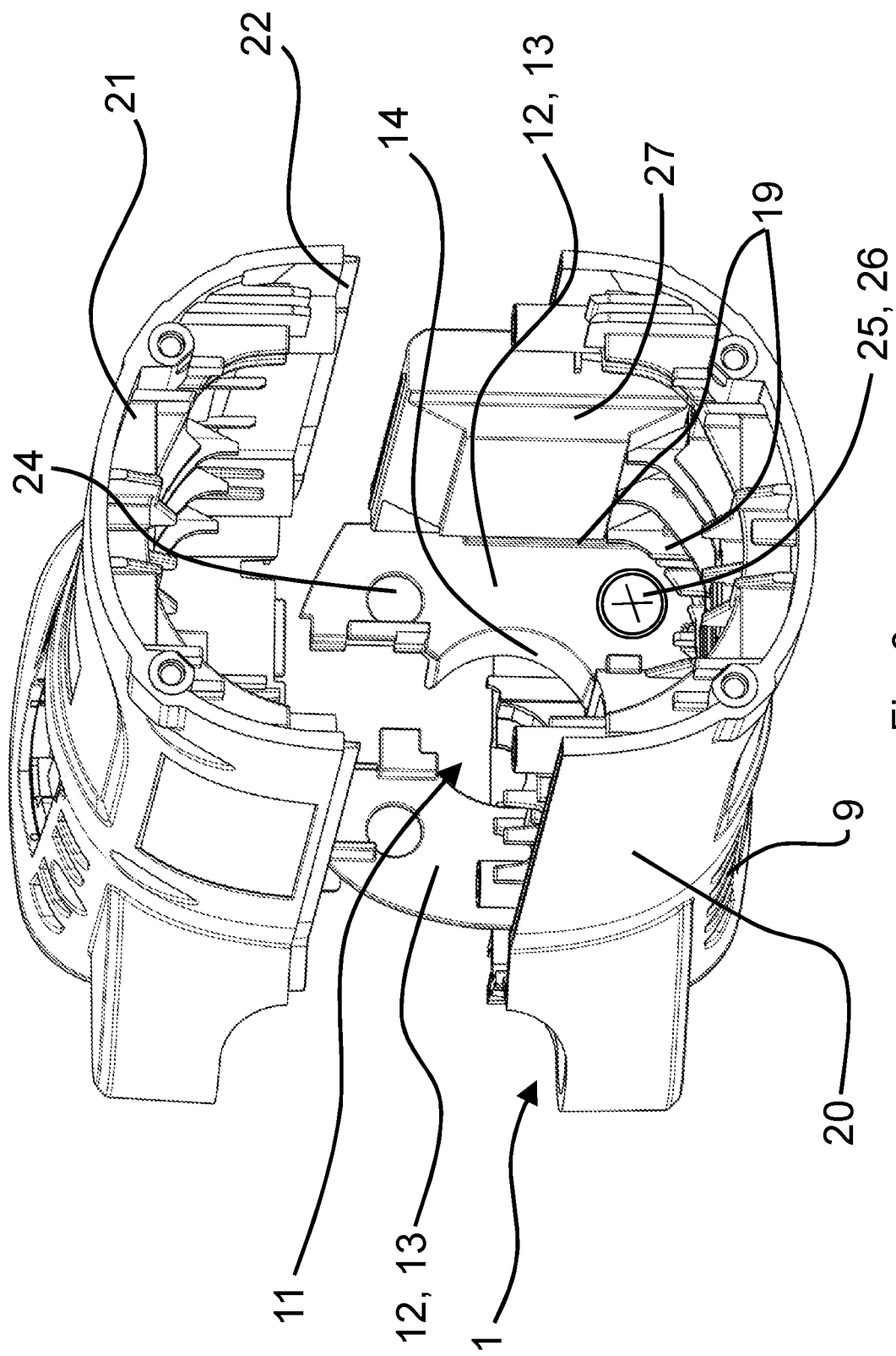
FIG. 3 shows an exploded perspective view of the housing with an inserted guide structure.

As can be gathered in particular from FIG. 3, which shows a reduced exploded view of housing 1, housing 1 is formed of multiple parts and comprises a first housing part 20 and a second housing part 21 which can be detachably connected to one another by a plug connection 22. This has advantages, in particular for the assembly, because it is now possible first to insert guide structure 12 into plug-in recess 19 of the first, or second, housing part 20, then additionally to mount motor 4 in first housing part 20, and then to attach thereto second housing part 21 with plug connection 22. In order to route connection cables 23 from motor 4 to the electronics located outside housing 1 in electronics housing 7, passages 24, through which connection cables 23 can be routed, are formed in guide structure 12. In the drawing, as indicated only as an example for one of passages 24, slotted rubber sleeves 25 are used, which serve as covers 26 to at least partially cover passages 24, as a result of which the sealing of passages 24 is improved and the cooling air is ultimately drawn substantially exclusively into gap 18 between motor mount 14 and commutator 15 and cannot flow through passages 24 formed in guide structure 12, which would have a negative effect on the cooling performance.

A guide insert 27 is further disposed in housing 1; its longitudinal axis 28 is oriented substantially parallel to motor shaft 5 of motor 4 and ultimately serves as a substitute, and thus as a placeholder, for the electronics, not directly required on motor 4 in the exemplary embodiment shown, in order to further seal the duct between motor 4. If, in contrast, it should be necessary in the case of motor 4 used to attach the electronics immediately adjacent to motor 4, then these can be inserted into housing 1 instead of guide insert 27.

Figure 4:
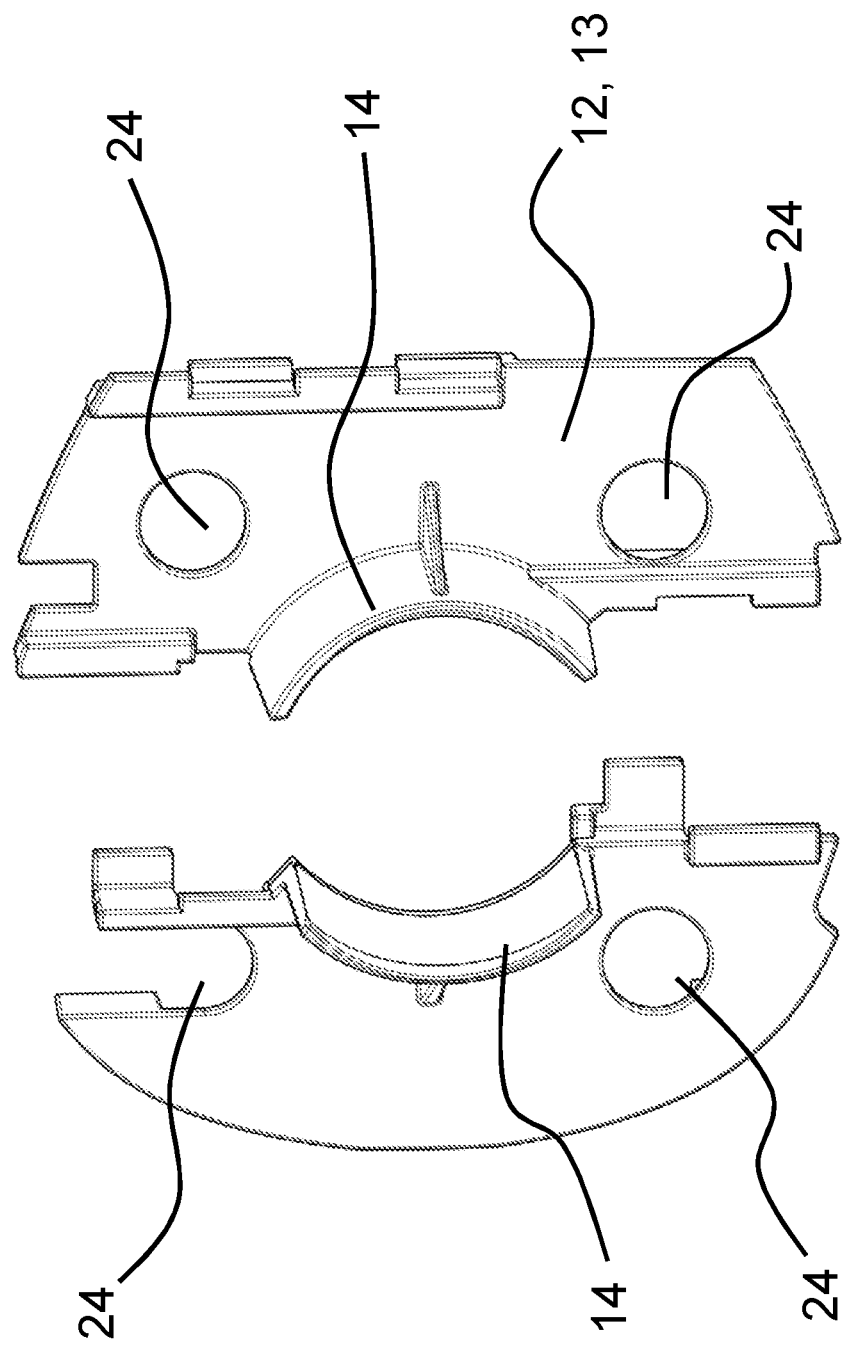
FIG. 4 shows a perspective view of the guide structure.

FIG. 4 shows a perspective view of guide structure 12, which is formed of multiple parts in the exemplary embodiment shown in order to guide the cooling air, flowing from air inlet 9 into housing 1, to motor 4. In particular, it is ensured by motor mount 14 that the parts of motor 4, which are disposed on the end of motor shaft 5, said end facing away from tool mount 6, can be cooled in a simplified manner with air inlet 9, because at least a large part of the cooling air is now fed through gap 18 between motor mount 14 and commutator 15 to motor 4.

Figure 5:
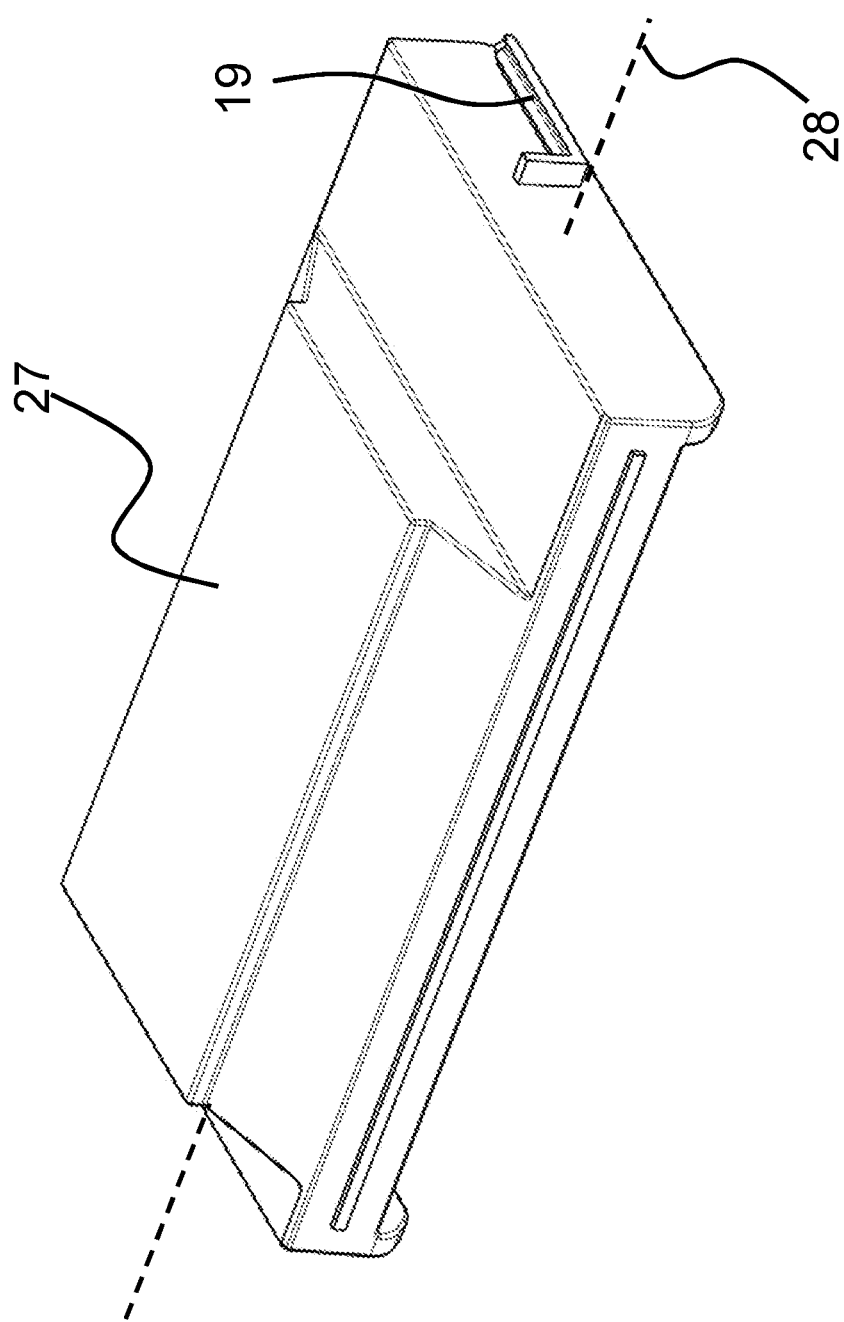
FIG. 5 shows a perspective view of a guide insert.

FIG. 5 shows guide insert 27, which essentially recreates the contour of electronics and can be replaced if necessary by such, if a motor 4 is to be used in which the electronics are to be mounted at this point.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for an electronic machine tool, the housing accommodating a motor that has a motor shaft for driving a tool mount, the housing comprising:
    at least one air duct to supply cooling air to the motor;
    at least one air inlet delimiting the at least one air duct at a first end;
    at least one air outlet delimiting the at least one air duct at a second end; and
    a guide structure to provide air guidance for the cooling air and having a motor mount on which the motor is at least partially accommodated, the guide structure being disposed in the air guide duct downstream from the at least one air inlet,
    wherein the motor mount is disposed on a side of the guide structure that faces away from the tool mount.

2. The housing according to claim 1, wherein the motor mount is disposed in an area of a commutator of the motor.

3. The housing according to claim 1, wherein the guide structure comprises a plate-shaped base body and wherein the motor mount extends substantially perpendicular to the base body.

4. The housing according to claim 3, wherein the base body is axially spaced from the at least one air inlet in a flow direction.

5. The housing according to claim 1, wherein at least one plug-in recess is formed in the housing for detachably receiving the guide structure.

6. The housing according to claim 1, wherein the housing is formed of multiple parts and comprises a first housing part and a second housing part, which are detachably connectable to one another by a plug connection.

7. The housing according to claim 1, wherein the guide structure is formed of multiple parts.

8. The housing according to claim 1, wherein passages are formed in the guide structure.

9. The housing according to claim 8, wherein the passages are covered at least partially by covers.

10. The housing according to claim 1, wherein an outer contour of the guide structure is adapted to an inner contour of the housing.

11. A housing for an electronic machine tool, the housing accommodating a motor that has a motor shaft for driving a tool mount, the housing comprising:
    at least one air duct to supply cooling air to the motor;
    at least one air inlet delimiting the at least one air duct at a first end;
    at least one air outlet delimiting the at least one air duct at a second end; and
    a guide structure to provide air guidance for the cooling air and having a motor mount on which the motor is at least partially accommodated, the guide structure being disposed in the air guide duct downstream from the at least one air inlet,
    wherein a gap, which has a width which lies between 10% and 30% or between 15% and 20% of a diameter of the motor shaft, is formed between the motor mount and a part of the motor that is surrounded by the motor mount.

12. The housing according to claim 11, wherein the gap has an annular shape at least in sections.

13. A housing for an electronic machine tool, the housing accommodating a motor that has a motor shaft for driving a tool mount, the housing comprising:
    at least one air duct to supply cooling air to the motor;
    at least one air inlet delimiting the at least one air duct at a first end;
    at least one air outlet delimiting the at least one air duct at a second end; and
    a guide structure to provide air guidance for the cooling air and having a motor mount on which the motor is at least partially accommodated, the guide structure being disposed in the air guide duct downstream from the at least one air inlet,
    wherein a guide insert is provided whose longitudinal axis is oriented substantially parallel to the motor shaft of the motor.

14. The housing according to claim 13, wherein the guide insert is disposed directly adjacent to the motor.

* * * * *